United States Patent [19]

Bhaumik et al.

[11] 4,068,195

[45] Jan. 10, 1978

[54] LASER MULTILINE SELECTION METHOD AND MEANS

[75] Inventors: Mani L. Bhaumik, Malibu; Gerard Hasserjian, Palos Verdes Peninsula, both of Calif.

[73] Assignee: Northrop Corporation, Los Angeles, Calif.

[21] Appl. No.: 590,630

[22] Filed: June 26, 1975

Related U.S. Application Data

[63] Continuation of Ser. No. 150,873, June 4, 1971, abandoned.

[51] Int. Cl.² ................................................ H01S 3/10
[52] U.S. Cl. ................................................ 331/94.5 G
[58] Field of Search ........................................ 331/94.5

[56] References Cited

U.S. PATENT DOCUMENTS

| 3,550,034 | 12/1970 | Hanst | 331/94.5 |
| 3,609,587 | 9/1971 | Kolb et al. | 331/94.5 |
| 3,643,175 | 2/1972 | Bhaumik et al. | 331/94.5 |

FOREIGN PATENT DOCUMENTS

| 984,590 | 2/1965 | United Kingdom | 331/94.5 |

*Primary Examiner*—William L. Sikes
*Attorney, Agent, or Firm*—Edward A. Sokolski

[57] ABSTRACT

A multiline laser and method of operating same which comprises selectively controlling the vibrational bands or lines emitted by the laser through incorporating into the laser an intracavity gas cell which contains sufficient concentration of molecules of at least one gas that will prevent at least one of the lines of said laser from achieving sufficient gain to lase in an undesirable line, leaving the laser oscillation to build up in the remaining lines.

7 Claims, 1 Drawing Figure

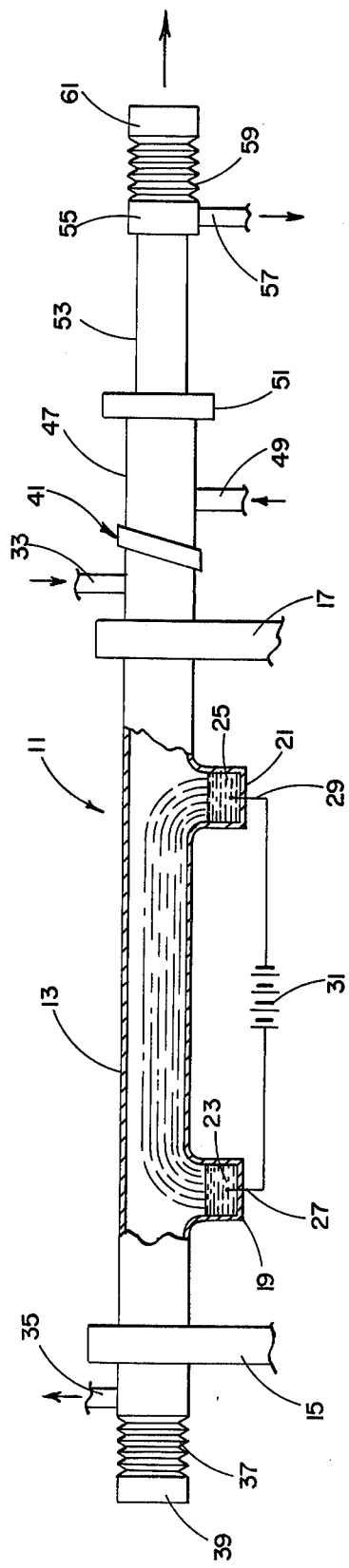

LASER MULTILINE SELECTION METHOD AND MEANS

ORIGIN OF THE INVENTION

The invention herein described was made in the course of a contract with the Office of Naval Research, Navy Department of the United States.

This application is a continuation of our application Ser. No. 150,873, filed June 4, 1971, and now abandoned.

The carbon monoxide laser has been shown to convert electrical energy into coherent radiation up to 47% efficiency, the highest achieved to date in a high average power device. The CO laser, unlike for example the $CO_2$ laser, simultaneously lases in several vibrational bands. The $CO_2$ laser radiates in only two bands. The bands that the $CO_2$ laser radiates can be readily transmitted through the atmosphere in that they are not absorbed thereby. On the other hand, the limitation to the practical usefulness of the CO laser is that many of its output lines are highly absorbed by the atmosphere. By incorporating a grating as a cavity element, a CO laser can be made to oscillate in a single line which can be transmitted through the atmosphere. However, when this approach is taken, the laser efficiency and power output are significantly reduced to approximately 25% of original value and therefore this approach is not very desirable. In order to obtain high efficiency and power in a CO laser it must lase simultaneously in several vibrational bands as compared to a single band (for $CO_2$ laser). The attenuation by the atmosphere of laser output is not only peculiar to the CO laser but also applicable to virtually any multiline laser which would have lines that would be so absorbed. For example, infrared lasers under development, such as the HF chemical lasers, have laser line emissions that are also highly attenuated in an atmospheric path.

Briefly, the herein invention comprises the utilization of an intracavity gas cell in a multiline laser. The gas cell will be located within the laser cavity between the end mirrors and separated from the main laser active gas by a Brewster window or other similar means. The intracavity gas cell will contain a gas or mixture of gases in sufficient concentration of molecules that are responsible for preventing selected laser lines from oscillating. Such a selection of lines could be adjusted so that the laser lines correspond to the transmission bands of different media. The intracavity cell provides a means of fine selection of lines. This could be supplemented by the adjustment of laser mirror reflectivity to limit the band of lines to a desired region. For example, the earth's atmospheric constituent primarily responsible for absorption is $H_2O$. Incorporation of $H_2O$ in the intracavity gas cell will prevent the laser from building up in the absorption lines of $H_2O$, such that the laser will simultaneously build up in lines that are not so absorbed. Therefore, these remaining emission lines will propagate through the Earth's atmosphere with minimal attenuation. It is generally preferred that the intracavity gas cell be brought to near atmospheric pressure by adding spectrally inert material gas such as $N_2$ to ensure compatability to the absorption characteristics of the constituents in the cell with those in the atmosphere. It is believed the invention will be further understood from the following description and drawings in which:

The FIGURE is a plan view of a laser of this invention.

Probably the closest to the concept of the herein invention relates to laser work sponsored by National Aeronautics and Space Administration pertaining to air pollution detection. In this effort, the output of a $CO_2$ laser was controlled so that the emission lines thereof matched the absorption bands of five selected pollutants. In this work, an attempt was made to shift the normal $CO_2$ laser emission bands to bands that would be so absorbed by selected pollutants. For example, ethylene was detected by slightly shifting the normal $CO_2$ laser emission. The shifting of the $CO_2$ emission was accomplished in this invention by adding a small amount of gas in the laser wave length control compartment. For example, by placing propylene in the controlled compartment the resulting $CO_2$ laser emission line fell near the strongest absorption peak in the ethylene spectrum. For the detection of ozone, the emission of the $CO_2$ laser was shifted by adding a greater amount of propylene to the controlled compartment. In other words, in this NASA work, the gas was added to the $CO_2$ laser causing it to shift its lines of emission to a peak that would be highly absorbed by one of the five selected pollutants.

The present invention, on the other hand, differs significantly in that gas or gases are added to an intracavity cell provided in a laser, to prevent a multiline laser from emitting in bands that are readily absorbed by certain medium constituents. Particularly, it has been found that by adding gases which highly absorb certain CO laser emission lines to the intracavity chamber, the laser will not emit in such lines.

The CO laser normally emits 10–20 lines and recently R. A. McClatchey of the Air Force Research Laboratory has made extensive calibrations which show that several of these lines should propagate with minimal attenuation through the Earth's atmosphere. The theoretical predictions indicate the following major lines with low attenuation (many other lines were also predicted).

6-5 P(10)
5-4 P(9), P(12), P(14), P(15)
4-3 P(15)
10-9 P(9)
7-6 P(15)
9-8 P(14)
10-9 P(12)

Turning now to the FIGURE, there is seen a laser 11 of a construction similar to that disclosed in patent application Ser. No. 71,023 filed Sept. 10, 1970, now U.S. Pat. No. 3,643,175. It should be understood that the construction of the basic laser utilized can vary considerably, but for purposes of illustration only, the CO laser described in the aforementioned application is given herein. Turning now to the FIGURE, there is seen a generally conventional laser tube in the oven incorporating means for admitting mercury vapor. The laser tube can be comprised of a cylinder of, for example, soft glass 13 supported by end plates 15 and 17. The tube 11 can have formed therein walls 19 and 21 spatially displaced from each other to contain pools of mercury 23 and 25 respectively. Electrodes 27 and 29 are embedded in the mercury pools 23 and 25, respectively. The electrodes are in turn connected to a high voltage power source 31. Of course, any suitable electrode arrangement can be used, the mercury arrangement being a novel approach disclosed in the aforementioned application.

A gaseous mixture can be admitted to the tube 11 through an inlet 33 at one end thereof while at a second end, an exit line 35 can be connected to a vacuum pump. At one end of the tube is a bellows 37 having a total reflector or mirror 39 affixed thereto. In a conventional laser a similar arrangement would be normally located at the opposite end of the laser tube utilizing a partially transparent mirror. However, in the herein invention, at the opposite end of the main laser tube relatively adjacent the inlet 33, is disposed a Brewster window 41. The Brewster window 41 allows a complete transmission of the build up laser therethrough. The Brewster window separates the main laser tube 13 from an additional tube 47. O-ring seals (not shown) serve to prevent any leakage about the Brewster windows. The tube 47 forms part of the gas cavity of the herein invention and has an inlet means 49 for admitting a gas or gaseous mixture thereto. Connected to tube 47 by means of a flange 51 is an additionally elongated tube 53 of a diameter merely sufficient to accommodate the laser beam. Tube 53 can be of varying lengths. It is utilized to control the concentration of gaseous molecules in the entire resulting gas chamber formed between tubes 47 and 53. The tube 53 is connected to a fitting 55 which has an outlet line 57 therein to allow the gas in the cavity to be admitted therefrom or to be connected to a vacuum source. In a static system, there would be no need for line 57. Additionally connected to the fitting 55 are bellows 59 and a partial reflector 61 which allows the laser beam to be extracted from the device. Thus, in accord with the present invention, a gas or gaseous mixture will be directed into the inlet 49 to fill the cavity comprised in tubes 47 and 53 in a sufficient number of gaseous molecules to achieve the desired effect, namely prevent the emission of lines through mirror 61 which are normally absorbed by the gas or gaseous mixture in the gas cell. It is believed that the invention will be further understood from the following detailed example. Though for ease of construction and disassembly, the gas cell is shown at one end of the laser tube, it can be located at any position within the tube. Thus, the cell can additionally be at the end of the tube adjacent the totally reflective mirror 39. Thus, the main objective is to subject the laser beam within the cavity to a gas or gases which will prevent the build up of gain in a desired line or lines regardless of the position of this cell in the cavity.

EXAMPLE

A laser having the configuration shown in the FIGURE was utilized. The laser was a CO laser utilizing a gaseous mixture for the gas cell comprising 15 torr $H_2O$ and 700 torr $N_2$. The length of the laser between the electrodes was 124 cm. The overall length between mirrors was 215 cm. The length of the gas cell from the Brewster window 41 to the flange fitting 55 was 50 cm. The central portion of the laser between the supports 15 and 17 was subjected to cryogenic temperatures by forming a chamber thereabout. The reason for the use of the cryogenic temperature was to increase the output of the CO. The power source 31 provided 12 kilo-volts to the electrodes in order to establish the desired power level. The laser tube had an inner diameter of 2 cm. Inlet line 49 to the intracavity gas cell was connected to a source of water while the exit line 57 was connected to a vacuum source, so that water vapor is produced in the gas tube at ambient conditions. Further, nitrogen is added to inlet 49 to bring the pressure up to atmospheric pressure within the gas cell. The resulting laser emitted lines at 7-6 P(13), P(14), P(15); 8-7 P(12), P(14); 9-8 P(12), P(13); 10-9 P(12), P(13); while the peaks indicating absorption by water vapor such as 7-6 P(14); 8-7 P(12); 9-8 P(12), P(13); 10-9 P(13) were diminished or did not exist at all.

Additionally, $CO_2$, varying from 0 to 100 torr partial pressure can be added to a gas cell of a CO laser where it is desired to decrease the lines of emission absorbed by the atmosphere. Further, other gases can be added, including $O_3$, $N_2O$, CO and $CH_4$, which play minor roles in atmospheric absorption of lines of emission of a CO laser. If sufficient concentration of molecules of these gases are placed in the intracavity gas cell then the laser will not build up in the absorption line of those gases. The molecular amount of the gas to be added can be determined by simple trial and error experiments whereby the amount of gas can be varied and the effect on the bands or lines of emission observed. In other words, the molecular content of $H_2O$ would be gradually increased in the intracavity cell to the point where the emission lines absorbed by $H_2O$ would virtually disappear from the laser output. It is to be noted that it is important to have a sufficient number of molecules in the path of the laser beam itself and thus the length of the cavity of the cell is more important than its total volume. Additionally, the cell containing $H_2O$ can be heated to increase the concentration of $H_2O$ vapor. There are three variables that can effect the amount of absorption due to the gases in the intracavity cell. These include the partial pressure of the added gas or gases, and the total gaseous pressure which can be controlled utilizing inert gases such as $N_2$. This provides a method of controlling the effective absorption band widths in the laser cavity comparable to the absorption bands in the atmosphere. Finally, the overall length of the gas cell is a variable, which as indicated, will effect the amount of molecules actually present in the laser beam path. The fine line selection by the intracavity gases can be supplemented by controlling the reflectivity of at least one of the cavity mirrors. For example, the reflectivity of one or both the mirrors can be made sufficiently low such that the CO laser does not build up in any vibrational band having wave lengths larger than those of the 8-7 band. In addition, the magnitude of the reflectivity in the desired wave length region can be adjusted to assist in the line selection by the intracavity gases.

We claim:
1. A gas laser comprising:
   means for forming a resonant optical path including a pair of oppositely positioned mirrors, one of said mirrors being a partial reflector adapted to pass therethrough a portion of the light incident thereon to provide a laser output,
   a first chamber positioned in said optical path,
   a lasing gas comprising carbon monoxide in said chamber,
   means for exciting said gas to effect lasing thereof whereby a laser beam is formed in said optical path,
   a second chamber positioned in said optical path, said second chamber being separate from said first chamber and having no fluid communications therewith, and
   a gaseous mixture in said second chamber comprising water vapor of sufficient concentration to remove lines from the laser beam which are significantly attenuated by the earth's atmosphere.

2. The gas laser of claim 1 wherein said gaseous mixture further includes nitrogen of sufficient concentration to maintain the mixture at substantially atmospheric pressure.

3. The gas laser of claim 2 wherein said gaseous mixture additionally includes carbon dioxide.

4. The gas laser of claim 3 wherein said gaseous mixture additionally includes $O_3$, $N_2O$, CO, and $CH_4$.

5. A method for removing lines which are significantly attenuated by the earth's atmosphere from the beam formed in the resonant optical path of a CO laser comprising:

providing a chamber in said resonant optical path which is not in fluid communications with the lasing gas chamber, and placing a gaseous mixture comprising water vapor in said first mentioned chamber of sufficient concentration to substantially absorb said lines.

6. The method of claim 5 and additionally adding nitrogen to the mixture of sufficient concentration to maintain the mixture at substantially atmospheric pressure.

7. The method of claim 5 and additionally including heating the mixture to increase the concentration of the water vapor.

* * * * *